US006620231B2

(12) United States Patent
Okubo et al.

(10) Patent No.: US 6,620,231 B2
(45) Date of Patent: Sep. 16, 2003

(54) ANTISTATIC COMPOSITION

(75) Inventors: Makoto Okubo, Wakayama (JP); Kazuo Fukumoto, Wakayama (JP)

(73) Assignee: Kao Corporation, Tokyo (JP)

( * ) Notice: Subject to any disclaimer, the term of this patent is extended or adjusted under 35 U.S.C. 154(b) by 141 days.

(21) Appl. No.: 09/805,161

(22) Filed: Mar. 14, 2001

(65) Prior Publication Data

US 2001/0034390 A1 Oct. 25, 2001

(30) Foreign Application Priority Data

Mar. 14, 2000 (JP) ........................................ 2000-071342

(51) Int. Cl.$^7$ ................................................. C09K 3/00
(52) U.S. Cl. .............................. 106/287.23; 106/287.3; 106/287.32; 106/638; 252/8.81; 264/165
(58) Field of Search .................. 264/165; 260/DIG. 16, 260/DIG. 15; 252/8.81; 106/287.23, 287.3, 287.32, 638

(56) References Cited

U.S. PATENT DOCUMENTS

| 4,127,552 A | 11/1978 | Bidston et al. |
| 4,605,684 A | 8/1986 | Pcolinsky, Jr. |
| 4,687,801 A | 8/1987 | Mitani et al. |
| 4,861,805 A | 8/1989 | Saavedra et al. |
| 4,895,886 A | 1/1990 | Felter et al. |
| 5,254,416 A | 10/1993 | Kubota |

FOREIGN PATENT DOCUMENTS

| EP | 293904 A2 | 7/1988 |
| JP | 6343951 A | 2/1988 |
| JP | 63154763 A | 6/1988 |
| JP | 4298517 A | 10/1992 |
| JP | 4298518 A | 10/1992 |

OTHER PUBLICATIONS

"Dielectric constants of 2–Propanol and N, N–Dimethylacetamide", CRC Handbook of CHemistry and Physics, (XP002169333) (2001).

*Primary Examiner*—John M. Cooney, Jr.
(74) *Attorney, Agent, or Firm*—Birch, Stewart, Kolasch & Birch, LLP

(57) ABSTRACT

In a method for improving antistatic properties, the improvement comprising the use of an antistatic composition comprising an ionic antistatic compound and a polar organic solvent; an antistatic composition comprising a nonmetallic antistatic compound, a metallic antistatic compound and a polar organic solvent; a formed article containing an antistatic composition comprising an ionic antistatic compound and a polar organic solvent; and a process for producing a polyurethane foam comprising reacting a polyol solution comprising a polyol component, a blowing agent and a catalyst, with an isocyanate prepolymer in the presence of an antistatic composition comprising an ionic antistatic compound and a polar organic solvent. The antistatic composition can be suitably used as shoe soles for safety shoes, working shoes, and the like.

15 Claims, No Drawings

ANTISTATIC COMPOSITION

BACKGROUND OF THE INVENTION

1. Field of the Invention

The present invention relates to an antistatic composition and a formed article comprising the same. More particularly, the present invention relates to an antistatic composition which exhibits excellent antistatic properties even at low temperatures, and a formed article comprising the antistatic composition, which can be suitably used as shoe soles for, for instance, safety shoes, working shoes, and the like.

2. Discussion of the Related Art

Conventionally, as methods of giving antistatic properties, there have been known a method of adding carbon black or a conductive filler; a method of applying or adding an ionic surfactant; a method of adding an alkali metal salt of perchloric acid, thiocyanic acid or nitric acid; and the like as disclosed in Japanese Patent Laid-Open No. Sho 63-43951. Also, there has been known a method of employing an alkali metal salt in which the anion of a non-volatile ionic alkali metal salt is trifluoromethanesulfonic acid ion, thiocyanic acid ion, or a tetraorganoboronium ion (Japanese Patent Laid-Open No. Sho 63-154763).

On the other hand, Japanese Patent Laid-Open Nos. Hei 4-298517 and Hei 4-298518 disclose an additive which gives a polyurethane excellent antistatic properties without any problems in molding, and a process for preparing the polyurethane. The additive comprises a quaternary ammonium alkylsulfate or quaternary ammonium perchlorate, and at least one metal salt selected from the group consisting of alkali metal salts and alkaline earth metal salts of perchloric acid, thiocyanic acid and nitric acid.

However, when a usual ionic surfactant is used alone, sufficient antistatic properties cannot be imparted to the polyurethane. Also, when the conductive filler is used in the raw materials of the polyurethane, the viscosity of the raw materials increases, so that there arises a problem in moldability. Also, the metal salts of perchloric acid, thiocyanic acid and trifluoromethanesulfonic acid quickly exhibit antistatic properties. However, those compounds have some defects such that the conductivities of a final product become insufficient. Also, as to the metal salt of perchloric acid, there is a risk of explosion due to its oxidative function, and as to the metal salt of thiocyanic acid, there is a problem in corrosion for metals. Also, as to the metal salt of nitric acid, there is a problem that a urethane becomes yellow.

Also, the use of the quaternary ammonium alkylsulfate or the quaternary ammonium perchlorate cannot satisfy the demands of stable conductivities just after molding and with the passage of time.

An object of the present invention is to provide an antistatic composition which exhibits excellent antistatic properties at low temperatures or room temperature, and a formed article comprising the antistatic composition.

These and other objects of the present invention will be apparent from the following description.

SUMMARY OF THE INVENTION

According to the present invention, there are provided:
(1) in a method for improving antistatic properties, the improvement comprising the use of an antistatic composition comprising an ionic antistatic compound and a polar organic solvent;
(2) an antistatic composition comprising a nonmetallic antistatic compound, a metallic antistatic compound and a polar organic solvent;
(3) a formed article containing an antistatic composition comprising an ionic antistatic compound and a polar organic solvent;
(4) the formed article according to item (3), wherein the formed article is a shoe sole;
(5) a safety shoe having a shoe sole of item (4); and
(6) a process for producing a polyurethane foam comprising reacting a polyol solution comprising a polyol component, a blowing agent and a catalyst, with an isocyanate prepolymer in the presence of an antistatic composition comprising an ionic antistatic compound and a polar organic solvent.

DETAILED DESCRIPTION OF THE INVENTION

Representative examples of the ionic antistatic compound include a nonmetallic antistatic compound and a metallic antistatic compound. Those compounds can be used alone or in admixture of at least two kinds. It is preferable in the present invention to use the nonmetallic antistatic compound together with the metallic antistatic compound, from the viewpoint of exhibiting excellent antistatic properties.

Representative examples of the nonmetallic antistatic compound include quaternary ammonium sulfonates having a substituent such as a hydrocarbon group or an oxyhydrocarbon group (hereinafter referred to as "substituted quaternary ammonium sulfonate"), and the like. Among the substituted quaternary ammonium sulfonates, it is preferable to use a substituted quaternary ammonium sulfonate represented by the formula (I):

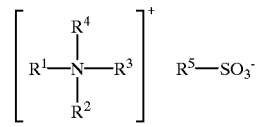

wherein $R^1$ is an alkyl group having 6 to 24 carbon atoms; each of $R^2$ and $R^3$ is independently an alkyl group having 1 to 4 carbon atoms, or $R^2$ is combined with $R^3$ to form an alkylene group having 4 to 5 carbon atoms or an oxyalkylene group having 3 to 4 carbon atoms, which forms a ring together with the adjacent nitrogen atom; $R^4$ is an alkyl group having 1 to 4 carbon atoms; and $R^5$ is a hydrocarbon group having 1 to 24 carbon atoms or an oxyhydrocarbon group having 1 to 24 carbon atoms.

In $R^1$, among the alkyl groups having 6 to 24 carbon atoms, decyl group, lauryl group, myristyl group, palmityl group and stearyl group are preferable because the amine which is used as a raw material for the substituted quaternary ammonium shows favorable liquid properties during the preparation of the substituted quaternary ammonium sulfonate, and is less odorous. It is preferable that $R^5$ is an alkyl group such as methyl group, an alkoxy group such as methoxy group or ethoxy group, or an aryl group such as phenyl group or p-methylphenyl group. In addition, when $R^2$ forms a ring together with $R^3$, each of $R^2$ and $R^3$ is preferably butylene group, pentylene group or ethylene oxyethylene group ($—C_2H_4—O—C_2H_4—$), from the viewpoint of giving a stable ring structure.

Among the substituted quaternary ammonium sulfonates, favorable ones are, for instance, dialkylsulfates such as N,N,N-trimethyl-N-laurylammonium methylsulfate,
N,N,N-trimethyl-N-cetylammonium methylsulfate,
N-ethyl-N,N-diethyl-N-stearylammonium ethylsulfate,
N-ethyl-N,N-dimethyl-N-laurylammonium ethylsulfate and
N,N-diethylmorpholinium ethylsulfate; methanesulfonates such as
N,N,N-trimethyl-N-laurylammonium methanesulfonate,
N,N,N-trimethyl-N-cetylammonium methanesulfonate,
N-ethyl-N,N-dimethyl-N-stearylammonium methanesulfonate,
N-ethyl-N,N-dimethyl-N-laurylammonium methanesulfonate and
N,N-diethylmorpholinium methanesulfonate; p-toluenesulfonates such as
N,N,N-trimethyl-N-laurylammonium p-toluenesulfonate,
N,N,N-trimethyl-N-cetylammonium p-toluenesulfonate,
N-ethyl-N,N-dimethyl-N-stearylammonium p-toluenesulfonate,
N-ethyl-N,N-dimethyl-N-laurylammonium p-toluenesulfonate,
N,N-diethylmorpholinium p-toluenesulfonate, N-ethyl-N-methylmorpholinium p-toluenesulfonate; and the like.

The substituted quaternary ammonium sulfonate represented by the formula (I) can be readily prepared by adding a dialkylsulfuric acid dropwise to a tertiary amine corresponding to the substituted quaternary ammonium sulfonate in an amount equivalent to the tertiary amine in a desirable solvent, preferably a glycol, e.g. at least one glycol selected from the group consisting of ethylene glycol, 1,4-butanediol and diethylene glycol, and reacting the dialkylsulfuric acid with the tertiary amine.

Representative examples of the metallic antistatic compound include a metal alkylsulfonate, a metal benzenesulfonate or a metal alkylbenzenesulfonate represented by the formula (II):

$$[R^6-SO_3^-]_n \cdot M^{n+} \quad (II)$$

wherein $R^6$ is an alkyl group having 1 to 7 carbon atoms, phenyl group or phenyl group having a substituent such as an alkyl group having 1 to 7 carbon atoms; M is a metal atom; and n is a valence of the metal atom; alkali metal salts or alkaline earth metal salts of acids such as hydrochloric acid, perchloric acid, nitric acid, trifluoromethanesulfonic acid, and thiocyanic acid; salts of phosphoric acid, sulfuric acid, boric acid or those organic derivatives and an alkali metal or an alkaline earth metal; and the like. Those metallic antistatic compounds can be used alone or in admixture of at least two kinds. Among them, the metal benzenesulfonate or alkylbenzenesulfonate represented by the formula (II) is preferable, and the metal toluenesulfonate is especially preferable, from the viewpoints of low costs, low corrosiveness, low toxicity, and easiness in incineration treatment without the generation of dioxin or the like.

In the metal alkylsulfonate, metal benzenesulfonate or metal alkylbenzenesulfonate represented by the formula (II), M is a metal atom. Among the metal atoms, alkali metal atoms such as lithium atom, sodium atom and potassium atom and alkaline metal earth atoms such as magnesium atom are preferable, and lithium atom is especially preferable, from the viewpoint of solubility in an organic solvent.

Favorable concrete examples of the metal alkylsulfonate, metal benzenesulfonate or metal alkylbenzenesulfonate represented by the formula (II) include lithium p-toluenesulfonate, sodium p-toluenesulfonate and potassium p-toluenesulfonate. Among them, lithium p-toluenesulfonate is especially preferable.

In the present invention, when the nonmetallic antistatic compound is used together with the metallic antistatic compound, excellent conductivities can be imparted to, for instance, a formed article and the like. In this case, as to the ratio of the nonmetallic antistatic compound to the metallic antistatic compound, it is preferable that the amount of the nonmetallic antistatic compound is 100 to 2000 parts by weight, preferably 100 to 1000 parts by weight, based on 100 parts by weight of the metallic antistatic compound, from the viewpoint of rapidly imparting excellent conductivities to a formed article and the like within the wide temperature and humidity ranges.

When the antistatic composition is incorporated into a resin formed article such as a formed article made of a polyurethane foam or the like, it is preferable that the ionic antistatic compound can be dissolved in a compound having not less than two hydroxyl groups in its molecule, which is a raw material of the resin formed article, from the viewpoint of homogeneously dispersing the ionic antistatic compound in the resin formed article. It is preferable that the antistatic composition is previously dissolved in an organic solvent, preferably a compound having not less than two hydroxyl groups in its molecule.

When preparing a polyurethane foam, as the compound having not less than two hydroxyl groups in its molecule, there can be exemplified polyol components such as polyester-polyols and polyether-polyols; and chain extenders such as polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine and alkylene oxide adducts of bisphenol A; and the like. Among them, at least one polyhydric alcohol selected from the group consisting of ethylene glycol, diethylene glycol and 1,4-butanediol is preferable, because the ionic antistatic compound can be sufficiently dissolved in those polyhydric alcohols as compared to other organic solvents, and a concentrated solution can be easily prepared, so that the polyhydric alcohol would not affect the resin even when the polyhydric alcohol is used as a constituent or a third component of the resin. Among them, ethylene glycol is especially preferable.

The ionic antistatic compound which can be dissolved in the compound having not less than two hydroxyl groups in its molecule includes nonmetallic ionic compounds such as dialkylsulfates such as
N,N,N-trimethyl-N-laurylammonium methylsulfate,
N,N,N-trimethyl-N-cetylammonium methylsulfate,
N-ethyl-N,N-dimethyl-N-stearylammonium ethylsulfate,
N-ethyl-N,N-dimethyl-N-laurylammonium ethylsulfate and
N,N-diethylmorpholinium ethylsulfate; methanesulfonates such as
N,N,N-trimethyl-N-laurylammonium methanesulfonate,
N,N,N-trimethyl-N-cetylammonium methanesulfonate,
N-ethyl-N,N-dimethyl-N-stearylammonium methanesulfonate,
N-ethyl-N,N-dimethyl-N-laurylammonium methanesulfonate and
N,N-diethylmorpholinium methanesulfonate; and p-toluenesulfonates such as
N,N,N-trimethyl-N-laurylammonium p-toluenesulfonate,
N,N,N-trimethyl-N-cetylammonium p-toluenesulfonate,
N-ethyl-N,N-dimethyl-N-stearylammonium p-toluenesulfonate,
N-ethyl-N,N-dimethyl-N-laurylammonium p-toluenesulfonate and
N,N-diethylmorpholinium p-toluenesulfonate; lithium salts such as lithium chloride, lithium perchlorate, lithium nitrate and lithium p-toluenesulfonate; and the like. Those ionic antistatic compounds are particularly favorable, because its solution having a high concentration of not less than 33% by weight can be prepared by dissolving the ionic antistatic compound in ethylene glycol.

The content of the ionic antistatic compound in the resin formed article into which the antistatic composition is incorporated is preferably not less than 0.5% by weight, more preferably not less than 1% by weight, from the viewpoint of sufficiently exhibiting the antistatic properties. In addition, the content of the ionic antistatic compound is preferably not more than 10% by weight, more preferably not more than 5% by weight, from the viewpoint of maintaining mechanical properties of the resin formed article. In consideration of the above viewpoints, a preferable range of the content of the ionic antistatic compound in the resin formed article is 0.1 to 10% by weight, and a more preferable range is 1 to 5% by weight.

One of the great features of the present invention resides in that the ionic antistatic compound is used together with a polar organic solvent. Since the ionic antistatic compound is used together with the polar organic solvent, excellent antistatic properties can be imparted to various formed articles even though the formed articles are in an atmosphere of low-temperatures such as 0° C.

The term "polar organic solvent" as referred to herein means an organic solvent having a polar molecule, which has a high dielectric constant. It is preferable that the melting point of the polar organic solvent is not more than 40° C., from the viewpoint of easiness in handling.

The dielectric constant of the polar organic solvent at 20° C. is preferably not less than 20, more preferably not less than 30, still more preferably not less than 40, most preferably not less than 50, from the viewpoint of giving excellent antistatic properties. The dielectric constant is less likely to be affected by temperature changes. However, there is a tendency that the lower the temperature is, the higher the dielectric constant becomes.

The polar organic solvent includes carbonates represented by cyclic carbonates such as ethylene carbonate (dielectric constant: 86.6 at 40° C.) and propylene carbonate (dielectric constant: 69.0 at 23° C.); amide compounds such as formamide (dielectric constant: 111.0 at 20° C.), N-methylformamide (dielectric constant: 182.4 at 25° C.), N,N-dimethylformamide (dielectric constant: 36.71 at 25° C.), N-methylacetamide (dielectric constant: 191.3 at 32° C.) and N,N-dimethylacetamide (dielectric constant: 37.78 at 25° C.); nitrile compounds such as acetonitrile (dielectric constant: 37.5 at 20° C.); nitro compounds such as nitromethane (dielectric constant: 35.87 at 30° C.); sulfur-containing compounds such as dimethyl sulfoxide (dielectric constant: 48.9 at 20° C.) and sulfolane (dielectric constant: 43.3 at 30° C.); phosphorus-containing compounds such as hexamethylphosphoric triamide (dielectric constant: 29.6 at 20° C.); and the like. Those polar organic solvents can be used alone or in admixture of at least two kinds. Among them, at least one compound selected from the group consisting of the carbonates such as cyclic carbonates represented by ethylene carbonate and propylene carbonate, the amide compounds, the sulfur-containing compounds and phosphorus-containing compounds is preferable. Also, N,N-dimethylformamide, dimethyl sulfoxide, sulfolane, ethylene carbonate, propylene carbonate, and the mixture of ethylene carbonate and propylene carbonate are more preferable, from the viewpoint of safety in human bodies, and ethylene carbonate, propylene carbonate, and the mixture of ethylene carbonate and propylene carbonate are furthermore preferable. Propylene carbonate and a mixture of ethylene carbonate and propylene carbonate are especially preferable, because those compounds are liquid at room temperature.

The content of the polar organic solvent in the resin formed article into which the antistatic composition is incorporated is preferably not less than 0.1% by weight, more preferably not less than 1% by weight, from the viewpoint of sufficiently exhibiting antistatic properties. In addition, the content of the polar organic solvent is preferably not more than 5% by weight, more preferably not more than 3% by weight, from the viewpoint of maintaining mechanical properties of the resin formed article. In consideration of the above points, the range of the content of the polar organic solvent in the resin formed article into which the antistatic composition is incorporated is preferably 0.1 to 5% by weight, more preferably 1 to 3% by weight.

It is desired that the ratio of the ionic antistatic compound to the polar organic solvent (ionic antistatic compound/polar organic solvent: weight ratio) is 1/2 to 20/1, preferably 2/3 to 5/1, from the viewpoint of giving sufficient antistatic properties and the viewpoint of maintaining physical properties of the resin formed article.

The antistatic composition can be favorably used for various molding materials. For instance, the antistatic composition can be incorporated into the formed article by mixing the antistatic composition with liquid molding materials, and thereafter molding the mixture into a desired shape.

The amount of the antistatic composition to be incorporated into the formed article cannot be absolutely determined, because the amount differs depending upon the antistatic properties required for the formed article. It is desired that the content of the antistatic composition in the formed article is not less than 0.6% by weight, preferably not less than 2% by weight, from the viewpoint of sufficiently giving antistatic properties, and that the content is not more than 15% by weight, preferably not more than 8% by weight, from the viewpoint of maintaining mechanical properties of a resin formed article.

Representative examples of the liquid molding materials include resins such as polyurethanes, epoxy resins, phenolic resins, polyesters, urea resins, olefinic resins such as polyethylene and polypropylene, and styrenic resins; rubbers such as natural rubbers, isoprene rubbers, chloroprene rubbers, styrene-butadiene rubbers, butadiene rubbers, acrylonitrile-butadiene rubbers, ethylene-propylene rubbers, butyl rubbers and acrylic rubbers; and the like.

The liquid molding materials can be ones which give foamed articles by expanding. The liquid molding materials for giving a foamed article include self-foamable polyurethanes, olefinic resins, styrenic resins, and the like. When the olefinic resins, the styrene resins and the like are used, there can be employed a process comprising prefoaming a resin and foaming the pre-foamed resin particles, or a process comprising impregnating a blowing agent into a resin, and thereafter foaming the resin in a mold.

Favorable exemplification for the liquid molding materials includes a polyurethane. When the antistatic composition is incorporated into the polyurethane foam, the resulting formed article of the polyurethane foam can be favorably used for shoe soles for safety shoes and working shoes requiring low static properties.

The starting materials for the polyurethane are not limited to specified ones, and known ones can be used. It is desired that a polyol solution and an isocyanate prepolymer are used as the starting materials for the polyurethane.

The polyol solution comprises a polyol component, a blowing agent, a catalyst, and as occasion demands, a surfactant and a chain extender.

As the polyol component, a compound having at least two active hydrogens can be used. The compound having at least two active hydrogens includes polyether-polyols such as ethylene oxide adducts or propylene oxide adducts of propylene glycol, glycerol, trimethylolpropane or sorbitol; polyester-polyols obtained from an acid component such as adipic acid, succinic acid, maleic acid or phthalic acid and a polyol component such as ethylene glycol, propylene glycol or butylene glycol; polybutadiene-polyols; and the like. Among them, the polyether-polyols and the polyester-polyols are preferable. It is preferable that the number-average molecular weight of the compound having at least two active hydrogens is 500 to 3000 or so.

As the blowing agent, water is generally employed. Besides water, low-boiling point organic solvents such as monofluorotrichloromethane, methylene chloride and pentane can be used as an auxiliary for foaming.

The surfactant includes commercially available silicone compounds for polyurethane foams, such as polydimethylsiloxanes and polysiloxane-polyalkylene oxide block copolymers; surface active agents, such as soaps, and ethylene oxide and/or propylene oxide adducts of alkylphenols or fatty acids; and the like.

As the chain extender, there can be used a compound containing at least two isocyanate-reactive hydrogen atoms and having a molecular weight of 32 to 400. Concrete examples of the compound include ethylene glycol, 1,2-propylene glycol, 1,3-propylene glycol, 1,4-butanediol, 2,3-butanediol, 1,5-pentanediol, 1,6-hexanediol, 1,8-octanediol, neopentyl glycol, 1,4-bis-hydroxylmethylcyclohexane, 2-methyl-1,3-propanediol, dibromobutanediol, glycerol, trimethylolpropane, 1,2,6-hexanetriol, trimethylolethane, pentaerythritol, xylitol, mannitol, sorbitol, castor oil, diethylene glycol, triethylene glycol, tetraethylene glycol, polyethylene glycols having a molecular weight of not more than 400, dipropylene glycol, polypropylene glycols having a molecular weight of not more than 400, dibutylene glycol, polybutylene glycols having a molecular weight of not more than 400, 4,4'-dioxydiphenylpropane and dioxymethylhydroquinone; aliphatic diamines such as ethanolamine, diethanolamine, N-methyldiethanolamine, triethanolamine, 3-aminopropanol, ethylenediamine and 1,4-tetraethylenediamine; aromatic diamines such as tolylenediamine and 4,4'-diaminodiphenylmethane; and the like. Those chain extenders ca be used alone or in admixture of at least two kinds. Among them, at least one compound selected from the group consisting of ethylene glycol, 1,4-butanediol and diethylene glycol is preferable, and ethylene glycol is more preferable.

Among the chain extenders, there are some chain extenders which are excellent in solubility of the ionic antistatic compound, for instance, a glycol having a short molecular chain such as ethylene glycol, diethylene glycol and 1,4-butanediol. The chain extender which is excellent in solubility of the ionic antistatic compound can be used alone or in admixture as a solvent for the ionic antistatic compound. When the chain extender is used as a solvent, the amount of the chain extender used as a solvent can be eliminated from the total amount of the chain extender.

The catalyst include organotin compounds such as stannous octoate and dibutyltin dilaurate; and amines such as triethylenediamine, triethylamine, N-ethylmorpholine, dimethylethanolamine, pentamethyldiethylenetriamine and palmityldimethylamine.

The isocyanate prepolymer can be prepared from a polyol component such as a polyether-polyol or a polyester-polyol, and a polyisocyanate component such as methylenediphenyl diisocyanate or a modified compound thereof.

A process of incorporating an antistatic composition into a formed article is not limited to specified ones. For instance, when the formed article is made of plural starting materials as used in a polyurethane or the like, the antistatic composition can be mixed with one of the starting materials. Alternatively, the ionic antistatic compound and the polar organic solvent constituting the antistatic composition are separately mixed with different starting materials, so that the antistatic composition is consequently incorporated into the formed article.

More specifically, when a formed article is made of, for instance, a polyurethane foam, there can be employed (A) a process of mixing the antistatic composition comprising an ionic antistatic compound and a polar organic solvent with a polyol component; (B) a process of mixing the ionic antistatic compound and the polar organic solvent separately with a polyol component; and (C) a process comprising mixing the ionic antistatic compound with the polyol component and also mixing the polar organic solvent with the isocyanate prepolymer, and reacting the polyol component with the isocyanate prepolymer, to form a polyurethane foam incorporating the antistatic composition. Among those processes, the process (C) is preferable because this process has an advantage that the decomposition of the polar organic solvent can be avoided by bringing the polar organic solvent in direct contact with the catalyst used for the polyol component.

Next, the antistatic composition is mixed with liquid molding materials, the resulting mixture is injected into a mold, and the mixture is molded into a desired shape by a conventional method.

The materials of the mold are not limited to specified ones. Examples thereof include iron, stainless steel, copper, aluminum, aluminum alloys, epoxy resins, phenolic resins, and the like. In addition, the internal shapes of the mold are not limited to specified ones, and any shapes can be employed so long as the internal surface of the mold has a shape corresponding to the shape of a desired formed article.

When the liquid molding material is molded in a mold, it is desirable to previously apply a mold releasing agent to the internal surface of the mold by means of coating, spraying, dipping, or the like in order to improve its releasing properties. The mold releasing agent includes dimethylsilicone oil, mineral oils, paraffin waxes, and the like, without intending to limit the present invention to those exemplified ones.

Thus, a formed article having a desired shape can be obtained by demolding the formed article from the mold. Since the antistatic composition is incorporated into the resulting formed article, there are exhibited excellent antistatic effects at low temperatures and room temperature.

Particularly, when the formed article is made of a polyurethane, the formed article can be favorably used as shoe soles for safety shoes, working shoes and the like which depress the generation of fire sparks when the shoes are contacted with the earth. The density of the formed article made of the polyurethane foam is preferably 0.3 to 1.0 g/cm³, more preferably 0.4 to 0.8 g/cm³, furthermore preferably 0.5 to 0.7 g/cm³ when the formed articles are shoes.

EXAMPLES

Production Example 1

There were premixed 90 parts by weight of a copolymer of adipic acid with ethylene glycol and 1,4-butanediol [ethylene glycol/1,4-butanediol (molar ratio)=2/1, acid value: 0.50 mg KOH/g, hydroxyl value: 52.0 mg KOH/g], 10 parts by weight of a copolymer of adipic acid with diethylene glycol and trimethylolpropane [diethylene glycol/trimethylolpropane (molar ratio)=15/1, acid value: 0.50 mg KOH/g, hydroxyl value: 61.0 mg KOH/g], 6.77 parts by weight of ethylene glycol, 1 part by weight of a silicone surfactant [commercially available from Dow Corning Toray Silicone Co., Ltd., under the trade name of SRX-295], 0.40 parts by weight of water, and 0.68 parts by weight of triethylenediamine as a catalyst, to give a composition A.

Production Example 2

There were mixed 41.0 parts by weight of dimethyllaurylamine with 10 parts by weight of ethylene glycol, and 59.0 parts by weight of diethyl sulfate was added dropwise thereto with stirring the mixture, so that the temperature of the mixture would not exceed 70° C.

After the termination of the dropwise addition of diethyl sulfate, the mixture was stirred at 60° C. for 1 hour, to give a 90% ethylene glycol solution of N-ethyl-N,N-dilaurylammonium ethyl sulfate (composition B).

Production Example 3

There were mixed 19.59 parts by weight of lithium hydroxide monohydrate with 100 parts by weight of water, with stirring. Thereafter, 88.82 parts by weight of p-toluenesulfonic acid monohydrate was added thereto. After the termination of addition, it was confirmed that the liquid was neutral by Bromocresol Green indicator. Thereafter, water was distilled from the reaction system. The temperature inside the vessel was controlled to 100° C., and pressure was controlled to 50 hPa. It was confirmed that no further water was distilled. Thereafter, 249.5 parts by weight of ethylene glycol was added to the residue, to give an ethylene glycol solution (composition C).

Preparation Example 1

There were mixed 110.60 parts by weight of the composition A with 2.692 parts by weight of ethylene glycol, to give a polyol solution A.

Preparation Example 2

There were mixed 110.60 parts by weight of the composition A, 6.318 parts by weight of the composition B and 3.091 parts by weight of the composition C, to give a polyol solution B.

Examples

In Experiment Example 1 and Experiment Examples 3 to 11 shown in Table 1, there were used as the polyol component, a mixture of 113.292 parts by weight of the polyol solution A or 120.009 parts by weight of the polyol solution B obtained in Preparation Example 1 or 2, with 6.032 parts by weight of a polar or nonpolar organic solvent shown in Table 1; and as the organic polyisocyanate compound, an organic polyisocyanate compound commercially available from Kao Corporation under the trade name of EDDYFOAM B-2009 having NCO % of 18.5%.

Also, in Experiment Example 2 shown in Table 1, there were used as the polyol solution, the polyol solution B, and as the organic polyisocyanate compound, a mixture of 100 parts by weight of an organic polyisocyanate compound commercially available from Kao Corporation under the trade name of EDDYFOAM B-2009 having NCO % of 18.5%, with 5.672 parts by weight of a polar or nonpolar organic solvent shown in Table 1.

The polyol component (the component A) was mixed with the organic polyisocyanate compound (the component B) by using a polyurethane injection molding machine commercially available from Polyurethane Engineering Co., Ltd. under the trade name of MU-203S with stirring. The mixture was poured into a mold having a length of 300 mm, a width of 100 mm and a depth of 10 mm. The mold temperature and demolding time were controlled to 45°±1° C. and 5 minutes, respectively, to give test pieces. In this case, both of the liquid temperatures of the component A and the component B were adjusted to 40°±1° C., and the mixing ratio of the component A to the component B was adjusted within the range of an isocyanate index of 95 to 100, so that the surface hardness became the highest after 3 minutes passed from the injection of a free foam.

Components of the antistatic composition contained in the resulting test pieces are shown in Table 1. The amount of the ionic antistatic agent listed in Table 1 is the amount which does not contain ethylene glycol, although the ionic antistatic agent was used in the form of an ethylene glycol solution, that is, in the form of baggage.

The test piece was placed on an aluminum plate having a length of 300 mm, a width of 100 mm and a thickness of 1 mm, and an aluminum plate having a length of 150 mm, a width of 70 mm and a thickness of 1 mm was placed on the test piece. The resistance between the upper and lower aluminum plates was determined by using a resistance tester commercially available from YOKOGAWA ELECTRIC WORKS under the trade name of Insulation-Resistance Tester (Battery type) TYPE 3213. As the resistance just after molding, the resistance after one day passed was determined, and as the stabilized resistance, the resistance after one week passed was determined. The results are also listed in Table 1.

TABLE 1

| Exp. Ex. No. | Kinds of Polyol Solution | Components of Antistatic Composition (% by weight) | | | | Content of Antistatic Composition in Polyurethane foam (% by weight) | Conductivity of Polyurethane Foam (MΩ) | | | | | |
|---|---|---|---|---|---|---|---|---|---|---|---|---|
| | | Ionic Antistatic Composition | | Polar Organic Solvent | Nonpolar Organic Solvent | | 0° C. × 75% RH | | 20° C. × 75% RH | | 40° C. × 11% RH | |
| | | Nonmetallic Antistatic Compound | Metallic Antistatic Compound | | | | After 1 Day | After 1 Week | After 1 Day | After 1 Week | After 1 Day | After 1 Week |
| 1 | B | ESDLA 45.5 | TSL 6.2 | PC 48.3 | — | 5.4 | 40 | 2.0 | 3.0 | 1.0 | 5.0 | 5.0 |
| 2 | B | ESDLA 45.5 | TSL 6.2 | PC 48.3 | — | 5.4 | 40 | 1.8 | 3.0 | 1.0 | 4.8 | 4.5 |
| 3 | B | ESDLA 45.5 | TSL 6.2 | EC 48.3 | — | 5.4 | 25 | 1.5 | 2.5 | 0.75 | 4.5 | 4.0 |
| 4 | B | ESDLA 45.5 | TSL 6.2 | FA 48.3 | — | 5.4 | 15 | 1.5 | 2.0 | 0.50 | 3.0 | 2.0 |
| 5 | A | — | — | — | — | 0 | ∞ | ∞ | ∞ | ∞ | ∞ | ∞ |
| 6 | A | — | — | PC 100 | — | 2.7* | ∞ | ∞ | ∞ | ∞ | ∞ | ∞ |
| 7 | A | — | — | EC 100 | — | 2.7* | ∞ | ∞ | ∞ | ∞ | ∞ | ∞ |
| 8 | A | — | — | FA 100 | — | 2.7* | ∞ | ∞ | ∞ | ∞ | ∞ | ∞ |
| 9 | B | ESDLA 88.0 | TSL 12.0 | — | — | 2.7** | 90 | 8.0 | 15 | 5.0 | 6.5 | 6.0 |
| 10 | B | ESDLA 45.5 | TSL 6.2 | — | DE 48.3 | 2.7** | 350 | 20 | 35 | 25 | 9.0 | 6.0 |
| 11 | B | ESDLA 45.5 | TSL 6.2 | — | DP 48.3 | 2.7** | 200 | 12 | 30 | 20 | 10 | 6.0 |

(Note)
ESDLA: N-ethyl-N,N-dimethyllaurylammonium ethyl sulfate; TSL: lithium p-toluenesulfonate; PC: propylene carbonate;
EC: ethylene carbonate; FA: formamide; DE: decane; DP: di-2-ethylhexyl phthalate
*: content of polar organic solvent only
**: content of ionic antistatic compound only It can be seen from the results shown in Table 1 that since a polar organic solvent is used in Experiment Examples 1 to 4, the resulting antistatic composition is excellent in conductivities. In particular, the conductivities of the antistatic compositions at 0° C., which is very severe condition for the conductivity, is not more than 100 MΩ.

Since the ionic antistatic compound is not contained in the antistatic composition of Experiment Examples 5 to 8, it can be seen that the electrical resistance exceeds the detection limit not only in the case where no solvent is contained in the composition, but also in the case where a solvent having a high dielectric constant is contained in the composition.

Since the ionic antistatic composition is used in Experiment Example 9, good conductive properties are exhibited. However, the conductivity is positioned around the upper limit of the standard (JIS T 8103-1983: standard for an electrostatic shoe being 0.1 to 100 MΩ). The conductivity of shoes was evaluated in JIS. However, the conductivity of sheets was evaluated in the present invention.

Since a nonpolar organic solvent such as decane (dielectric constant: 1.99 at 40° C.) or di-2-ethylhexyl phthalate (dielectric constant: 5.3 at 20° C.) is used in Experiment Examples 10 and 11, it can be seen that the conductivity is contrariwise lowered.

Next, as the physical properties of the polyurethane foam obtained in Experiment Example 1 and Experiment Example 9, density, C hardness, modulus, strength and elongation at break, tear strength, and flexural resistance were evaluated in accordance with the following methods. The results are shown in Table 2.

Density

The density of a formed article was determined by weighing the polyurethane foam sheet of 300 mm×100 mm×10 mm (thickness), and dividing the value by its volume, i.e. 300 cm$^3$.

C Hardness

The C hardness was determined by Asker C hardness tester.

Modulus

The strength and elongation at break were determined in accordance with JIS K 6301. The tensile stress at 100% elongation, 200% elongation and 300% elongation are referred to as 100% modulus, 200% modulus and 300% modulus, respectively.

Strength and Elongation at Break, and Tear Strength

Those properties were determined in accordance with JIS K 6301.

Flexural Resistance

The growth of cracks after 20000 runs of a flexural resistance test was examined in accordance with JIS K 6301. The evaluation was carried out in accordance with the following evaluation criteria:

Evaluation Criteria

○: No growth of cracks was observed.
x: Growth of cracks was observed.

TABLE 2

| Exp. Ex. No. | 1 | 9 |
|---|---|---|
| Physical Properties of Formed Article | | |
| Density (g/cm$^3$) | 0.55 | 0.55 |
| C Hardness (Asker C) | 70 | 72 |
| Modulus (MPa) | | |
| 100% | 1.38 | 1.73 |
| 200% | 2.18 | 2.70 |
| 300% | 3.04 | 3.72 |
| Strength at Break (MPa) | 6.63 | 7.56 |
| Elongation at Break (%) | 540 | 520 |

TABLE 2-continued

| Exp. Ex. No. | 1 | 9 |
|---|---|---|
| Tear Strength (N/mm) | 31.2 | 34.2 |
| Flexural Resistance | ○ | ○ |

As is clear from the results shown in Table 2, it can be seen that each of the polyurethane foams obtained in Experiment Examples 1 and 9 satisfies both the standards for the tensile test (tensile strength being not less than 6 MPa, elongation being not less 300%) and the standards for tear test (not less than 25 N/mm) for the polyurethane foams as prescribed in JIS T 8103-1983.

According to the present invention, there can be obtained an antistatic composition which exhibits excellent antistatic properties even at low temperatures, and a formed article comprising the antistatic composition. Particularly, the antistatic composition of the present invention can be favorably used for a formed article such as polyurethane foam which can be used as soles of safety shoes.

Equivalent

Those skilled in the art will recognize, or be able to ascertain using simple routine experimentation, many equivalents to the specific embodiments of the invention described in the present specification. Such equivalents are intended to be encompassed in the scope of the present invention as recited in the following claims.

What is claimed is:

1. In a method for improving antistatic properties of an article by addition of an antistatic composition thereto, the improvement wherein the antistatic composition comprises a non-metallic antistatic compound comprising a quaternary ammonium sulfonate having a hydrocarbon group or an oxyhydrocarbon group, a metallic antistatic compound, and a polar organic solvent.

2. The method according to claim 1, wherein the polar organic solvent has a dielectric constant of not less than 20 at 20° C.

3. The method according to claim 2, wherein the polar organic solvent having a dielectric constant of not less than 20 at 20° C. is a cyclic carbonate.

4. The method according to claim 3, wherein the cyclic carbonate is propylene carbonate.

5. An antistatic composition comprising a nonmetallic antistatic compound comprising a quaternary ammonium sulfate having a hydrocarbon group or an oxyhydrocarbon group, a metallic antistatic compound and a polar organic solvent.

6. A formed article containing an antistatic composition comprising a non-metallic antistatic compound comprising a quaternary ammonium sulfate having a hydrocarbon group or an oxyhydrocarbon group, a metallic antistatic compound, and a polar organic solvent.

7. The method according to claim 1, wherein the quaternary ammonium sulfonate is a quaternary ammonium sulfonate represented by the formula (I):

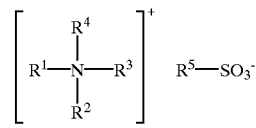

(I)

wherein $R^1$ is an alkyl group having 6 to 24 carbon atoms; each of $R^2$ and $R^3$ is independently an alkyl group having 1 to 4 carbon atoms, or $R^2$ is combined with $R^3$ to form an alkylene group having 4 to 5 carbon atoms or an oxyalkylene group having 3 to 4 carbon atoms, which forms a ring together with the adjacent nitrogen atom; $R^4$ is an alkyl group having 1 to 4 carbon atoms; and $R^5$ is a hydrocarbon group having 1 to 24 carbon atoms or an oxyhydrocarbon group having 1 to 24 carbon atoms.

8. The method according to claim 1, wherein the metallic antistatic compound is a metal alkylsulfonate, a metal benezenesulfonate or a metal alkylbenezenesulfonate.

9. The method according to claim 1, wherein the amount of the nonmetallic antistatic compound is 100 to 2000 parts by weight based on 100 parts by weight of the metallic antistatic compound.

10. The antistatic composition according to claim 5, wherein the quaternary ammonium sulfonate is a quaternary ammonium sulfonate represented by formula (I):

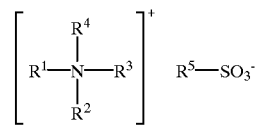

(I)

wherein $R^1$ is an alkyl group having 6 to 24 carbon atoms; each of $R^2$ and $R^3$ is independently an alkyl group having 1 to 4 carbon atoms, or $R^2$ is combined with $R^3$ to form an alkylene group having 4 to 5 carbon atoms or an oxyalkylene group having 3 to 4 carbon atoms, which forms a ring together with the adjacent nitrogen atom; $R^4$ is an alkyl group having 1 to 4 carbon atoms; and $R^5$ is a hydrocarbon group having 1 to 24 carbon atoms or an oxyhydrocarbon group having 1 to 24 atoms.

11. The antistatic composition according to claim 5, wherein the metallic antistatic compound is a metal alkylsulfonate, a metal benzenesulfonate or a metal alkylbenzensulfonate.

12. The antistatic composition according to claim 5, wherein the amount of the nonmetallic antistatic compound is 100 to 2000 parts by weight based on 100 parts by weight of the metallic antistatic compound.

13. The formed article according to claim 6, wherein the quaternary ammonium sulfonate is a quaternary ammonium sulfonate represented by the formula (I):

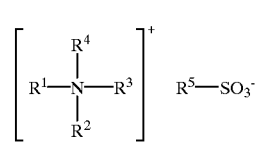

(I)

wherein $R^1$ is an alkyl group having 6 to 24 carbon atoms;

each of $R^2$ and $R^3$ is independently an alkyl group having 1 to 4 carbon atoms, or $R^2$ is combined with $R^3$ to form an alkylene group having 4 to 5 carbon atoms or an oxyalkylene group having 3 to 4 carbon atoms, which forms a ring together with the adjacent nitrogen atom;

$R^4$ is an alkyl group having 1 to 4 carbon atoms; and $R^5$ is a hydrocarbon group having 1 to 24 carbon atoms or an oxyhdrocarbon group having 1 to 24 carbon atoms.

14. The formed article according to claim 6, wherein the metallic antistatic compound is a metal alkylsulfonate, a metal benzenesulfonate or a metal alkylbenezenesulfonate.

15. The formed article according to claim 6, wherein the amount of the nonmetallic antistatic compound is 100 to 2000 parts by weight based on 100 parts by weight of the metallic antistatic compound.

* * * * *